(12) United States Patent
Chikamori et al.

(10) Patent No.: US 11,788,863 B2
(45) Date of Patent: Oct. 17, 2023

(54) MAP INFORMATION SYSTEM

(71) Applicant: HONDA MOTOR CO., LTD., Tokyo (JP)

(72) Inventors: Hidetoshi Chikamori, Saitama (JP); Kazumasa Nakamura, Saitama (JP); Hitoshi Konishi, Saitama (JP); Takuji Harayama, Saitama (JP); Tomoaki Masakawa, Tokyo (JP); Naofumi Aso, Saitama (JP); Ryo Matsuzawa, Tokyo (JP); Zhaoqi Wang, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 47 days.

(21) Appl. No.: 17/571,620

(22) Filed: Jan. 10, 2022

(65) Prior Publication Data
US 2022/0221305 A1    Jul. 14, 2022

(30) Foreign Application Priority Data

Jan. 12, 2021   (JP) ................................. 2021-002783

(51) Int. Cl.
*G01S 19/14*        (2010.01)
*B60W 60/00*        (2020.01)
*G01C 21/00*        (2006.01)

(52) U.S. Cl.
CPC ....... *G01C 21/3859* (2020.08); *B60W 60/001* (2020.02); *G01C 21/3822* (2020.08);
(Continued)

(58) Field of Classification Search
CPC ............ G01C 21/3859; G01C 21/3896; G01C 21/3837; G01C 21/3822; G06Q 50/30;
(Continued)

(56) References Cited

U.S. PATENT DOCUMENTS

2016/0259814 A1   9/2016  Mizoguchi
2016/0260328 A1*  9/2016  Mishra .................. G01S 13/931
(Continued)

FOREIGN PATENT DOCUMENTS

CN       110021185 A  *  7/2019 ............. G01S 19/42
CN       111141258 A  *  5/2020 ............... G01C 9/00
(Continued)

OTHER PUBLICATIONS

CN-111141258-A, English Translation, (Year: 2020).*
(Continued)

*Primary Examiner* — Rodney A Butler
(74) *Attorney, Agent, or Firm* — Armstrong Teasdale LLP

(57) ABSTRACT

A map information system includes: a vehicle configured to store at least one piece of map information and travel autonomously based on the map information; and a map server configured to provide the vehicle with the map information, wherein the vehicle includes: an external environment sensor configured to acquire surrounding information on the vehicle; and a controller configured to store the map information and execute travel control to cause the vehicle to travel autonomously, the controller is configured to determine whether the travel control based on the map information and the surrounding information can be executed based on whether the map information matches the surrounding information, and the controller notifies the map server of a position of the vehicle and notifies the map server that the map information should be updated upon determining that the travel control cannot be executed.

8 Claims, 8 Drawing Sheets

(52) U.S. Cl.
CPC .......... *G01S 19/14* (2013.01); *B60W 2520/16* (2013.01); *B60W 2540/215* (2020.02); *B60W 2552/15* (2020.02); *B60W 2556/50* (2020.02); *B60W 2556/60* (2020.02)

(58) Field of Classification Search
CPC .......... B60W 60/001; B60W 2520/16; B60W 2540/215; B60W 2552/15; B60W 2556/50; B60W 2556/60; B60W 2556/40; G01S 19/14; G01S 19/50; G06F 16/29
See application file for complete search history.

(56) References Cited

U.S. PATENT DOCUMENTS

| | | | |
|---|---|---|---|
| 2018/0058860 A1 | 3/2018 | Matsumoto et al. | |
| 2020/0249670 A1 | 8/2020 | Takemura et al. | |
| 2020/0314389 A1* | 10/2020 | Sakurada | G06V 20/56 |
| 2021/0041263 A1 | 2/2021 | Hirate et al. | |
| 2021/0131813 A1* | 5/2021 | Chen | G05D 1/02 |
| 2021/0149413 A1* | 5/2021 | Sohn | G06V 20/10 |
| 2021/0253107 A1* | 8/2021 | Takamatsu | G08G 1/167 |

FOREIGN PATENT DOCUMENTS

| | | |
|---|---|---|
| JP | 2013156825 A | 8/2013 |
| JP | 2015035104 A | 2/2015 |
| JP | 2016161456 A | 9/2016 |
| JP | 2016162353 A | 9/2016 |
| JP | 2019191653 A | 10/2019 |
| JP | 2021012428 A * | 2/2021 |
| WO | 2018180097 A1 | 10/2018 |

OTHER PUBLICATIONS

JP-2021012428-A, English Translation, (Year: 2021).*
CN-110021185-A, English Translation, (Year: 2021).*
Notice of Reasons for Refusal for Japanese Patent Application No. 2021-002783 dated Nov. 8, 2022; 9 pp.

* cited by examiner

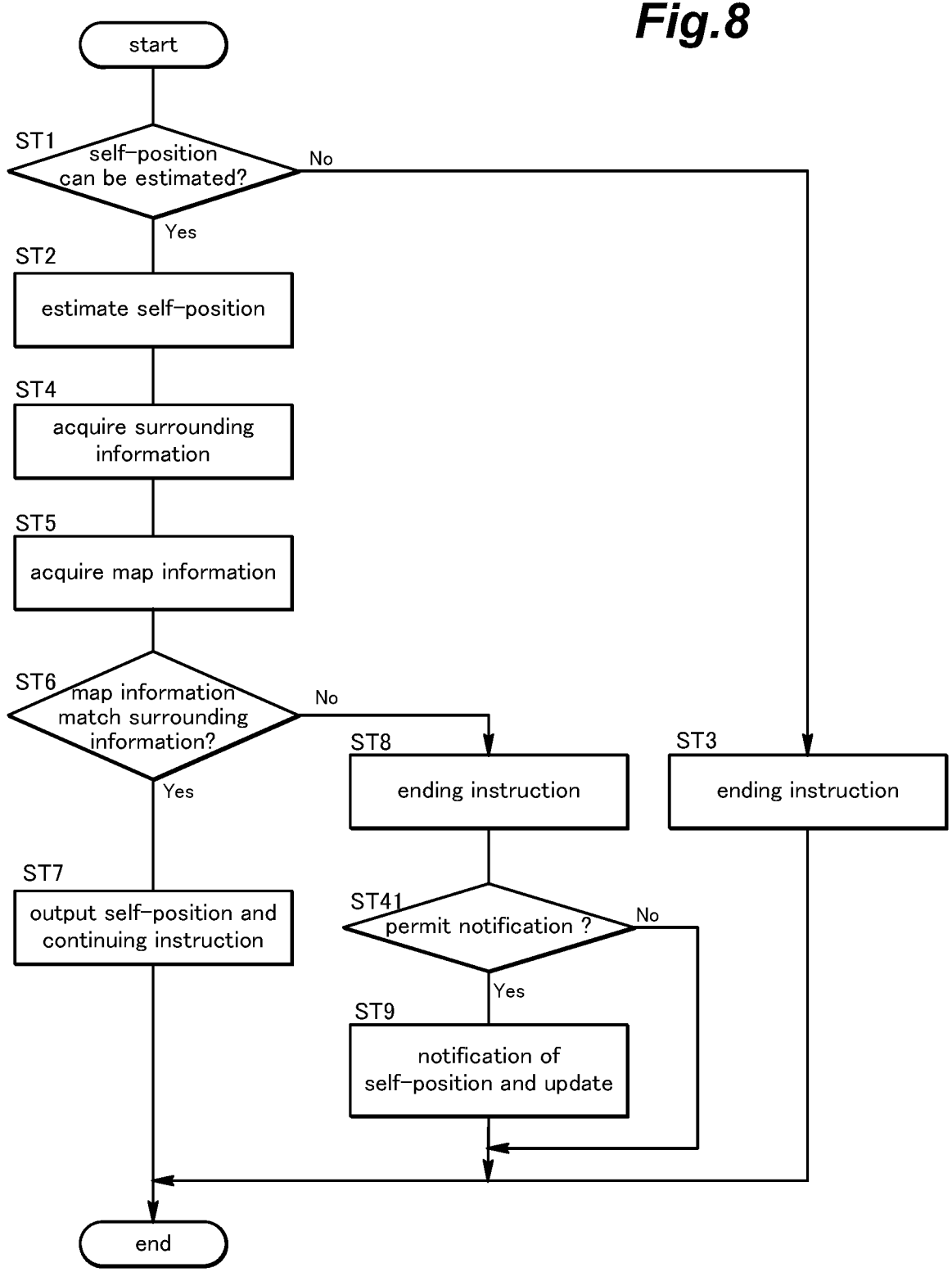

MAP INFORMATION SYSTEM

TECHNICAL FIELD

The present invention relates to a map information system including a controller configured to control a vehicle and a map server configured to store a high-precision map used for autonomous travel of the vehicle. In particular, the present invention relates to a map information system in which a map server updates a high-precision map based on information acquired by a sensor mounted on a vehicle.

BACKGROUND ART

A known map data processing device for a vehicle accurately grasps a difference between a detailed map database used for travel control of the vehicle and an actual road state/environment and keeps the map database in the latest state, thereby achieving precise travel control (for example, JP2016-161456A).

The map data processing device disclosed in JP2016-161456A first calculates, based on reliability, updating data from the map data calculated based on a recognition result of a surrounding environment and a travel condition of the vehicle. After that, when a discrepancy occurs between the updating data and the map data in the map database, the map data processing device determines whether the map data or the updating data is correct, and executes an updating process of the map database in a case where the map database should be updated.

The map data processing device disclosed in JP2016-161456A executes the updating process of the map database based on information from the vehicle. However, the discrepancy between the updating data based on the surrounding environment and the map data in the map database may be caused when a signal from a positioning satellite cannot be received, for example. In such a case, the map database may be updated incorrectly.

SUMMARY OF THE INVENTION

In view of the above background, an object of the present invention is to provide a map information system that includes a vehicle configured to store at least one piece of map information and travel autonomously based on the map information and a map server configured to provide the vehicle with the map information, and can improve the accuracy of determination as to whether the map information should be updated based on information acquired by a sensor installed in the vehicle.

To achieve such an object, one aspect of the present invention provides a map information system (1), comprising: a vehicle (V) configured to store at least one piece of map information and travel autonomously based on the map information; and a map server (3) configured to provide the vehicle with the map information, wherein the vehicle includes: an external environment sensor (7) configured to acquire surrounding information on the vehicle; and a controller (16) configured to store the map information and execute travel control to cause the vehicle to travel autonomously, the controller is configured to determine whether the travel control based on the map information and the surrounding information can be executed based on whether the map information matches the surrounding information, and the controller notifies the map server of a position of the vehicle and notifies the map server that the map information should be updated upon determining that the travel control cannot be executed.

According to this aspect, when the vehicle cannot travel autonomously, the map server is notified of the position of the vehicle that cannot travel autonomously and notified that the map information should be updated. A person who manages the map server (hereinafter referred to as "the map information manager") acquires the notification and conducts a road survey or the like at the position of the vehicle included in the notification, thereby determining whether the map information matches an actual road. Accordingly, the map information manager can determine whether the map information should be updated, so that it is possible to improve the accuracy of the determination as to whether the map information should be updated.

In the above aspect, preferably, wherein when the map information does not match the surrounding information, the controller extracts an area where the map information does not match the surrounding information, determines whether a moving object is present in the area based on a detection result of the external environment sensor, and determines that the travel control based on the map information and the surrounding information cannot be executed when the moving object is present in the area.

According to this aspect, in a case where the moving object is present in the area where the map information does not match the surrounding information, the travel control based on the map information and the surrounding information is stopped, so that the safety of the vehicle can be enhanced.

In the above aspect, preferably, the map information system further comprising: a vehicle sensor (8) for estimating a movement amount of the vehicle; and a receiver (10) configured to receive a signal from a positioning satellite, wherein the controller is configured to execute first travel control and second travel control as the travel control, the first travel control being executed for estimating the position of the vehicle by using the movement amount based on the vehicle sensor so as to cause the vehicle to travel autonomously, the second travel control being executed for estimating the position of the vehicle based on the signal from the positioning satellite received by the receiver so as to cause the vehicle to travel autonomously based on the map information, and in a case where the position of the vehicle can be estimated neither by using the movement amount based on the vehicle sensor nor based on the signal from the positioning satellite, the controller determines that the travel control based on the map information and the surrounding information cannot be executed, and notifies the map server of the position of the vehicle and notifies the map server that the map information should be updated.

According to this aspect, the controller can cause the vehicle to travel autonomously by two types of travel control, so that redundancy of the travel control can be enhanced.

Also, even if the signal from the positioning satellite becomes unreceivable, the map server is not notified that the map information should be updated as long as the vehicle can travel autonomously. Accordingly, it is possible to prevent the map server from being notified that the map information should be updated each time the signal from the positioning satellite becomes unreceivable (for example, each time the vehicle enters a tunnel) as the controller determines that the map information does not match the surrounding information because a self-position (an own vehicle position) cannot be estimated based on the signal from the positioning satellite.

In the above aspect, preferably, the map information includes additional information including information on reception intensity of the signal from the positioning satellite in each lane, and the controller notifies the map server that the map information should be updated upon determining that the reception intensity of the signal from the positioning satellite received by the receiver does not match the additional information.

According to this aspect, it is possible to notify the map server that the additional information does not reflect an actual situation.

In the above aspect, preferably, the map information system further comprising an attitude angle sensor (8A) configured to acquire an attitude angle of the vehicle, wherein the map information includes additional information including gradient information indicating a gradient of a road surface, and the controller notifies the map server that the map information should be updated upon determining that the gradient information at the position of the vehicle in the map information does not match the attitude angle of the vehicle acquired by the attitude angle sensor.

According to this aspect, it is possible to notify the map server that the additional information does not reflect an actual situation.

In the above aspect, preferably, the at least one piece of map information comprises plural pieces of map information, the controller is configured to store the plural pieces of map information generated at different periods and compare the plural pieces of map information with the surrounding information in reverse chronological order, and in a case where one of the plural pieces of map information matches the surrounding information and the one of the plural pieces of map information is not the latest of the plural pieces of map information stored in the controller, the controller notifies the map server that the map information should be updated.

According to this aspect, even if the map information stored in the map server is updated based on incorrect information, it is possible to cause the vehicle to travel autonomously based on old map information before the update. Further, since notification is given to the map server, the map information manager can appropriately determine whether the map information should be updated.

In the above aspect, preferably, the map information system further comprising an input/output device (14) configured to give notification to an occupant and accept an input by the occupant, wherein in a case where the map information does not match the surrounding information, the controller causes the input/output device to give the notification that the map information does not match the surrounding information and accept the input as to whether to notify the map server that the map information should be updated.

According to this aspect, when the input/output device accepts the input by the occupant that requests notification to the map server, the controller notifies the map server that the map information should be updated. Accordingly, whether the map information should be updated is determined by the occupant, so that the accuracy of determination as to whether to update the map information can be improved.

In the above aspect, preferably, the map information includes attribute information indicating a travel direction of each lane, and the controller notifies the map server that the map information should be updated upon determining that a behavior of a surrounding vehicle acquired by the external environment sensor does not match the attribute information.

According to this aspect, it is possible to easily determine that the map information does not match an actual state around the vehicle, and notify the map information manager of the mismatch thereof when the map information does not match the actual state around the vehicle.

In the above aspect, preferably, the map information includes positional information on lanes, and the controller notifies the map server that the map information should be updated upon determining that the number of lanes in front of the vehicle acquired by the external environment sensor does not match the number of lanes in front of the vehicle acquired from the map information.

According to this aspect, it is possible to easily determine that the map information does not match an actual state around the vehicle, and notify the map information manager of the mismatch thereof when the map information does not match the actual state around the vehicle.

Thus, according to the above aspects, it is possible to provide a map information system that includes a vehicle configured to store at least one piece of map information and travel autonomously based on the map information and a map server configured to provide the vehicle with the map information, and can improve the accuracy of determination as to whether the map information should be updated based on information acquired by a sensor installed in the vehicle.

BRIEF DESCRIPTION OF THE DRAWING(S)

FIG. 8 is a flowchart of a determining process executed by a controller of a map information system according to a fifth embodiment.

DETAILED DESCRIPTION OF THE INVENTION

In the following, a map information system according to an embodiment of the present invention will be described with reference to the drawings.

The First Embodiment

Figure 1:
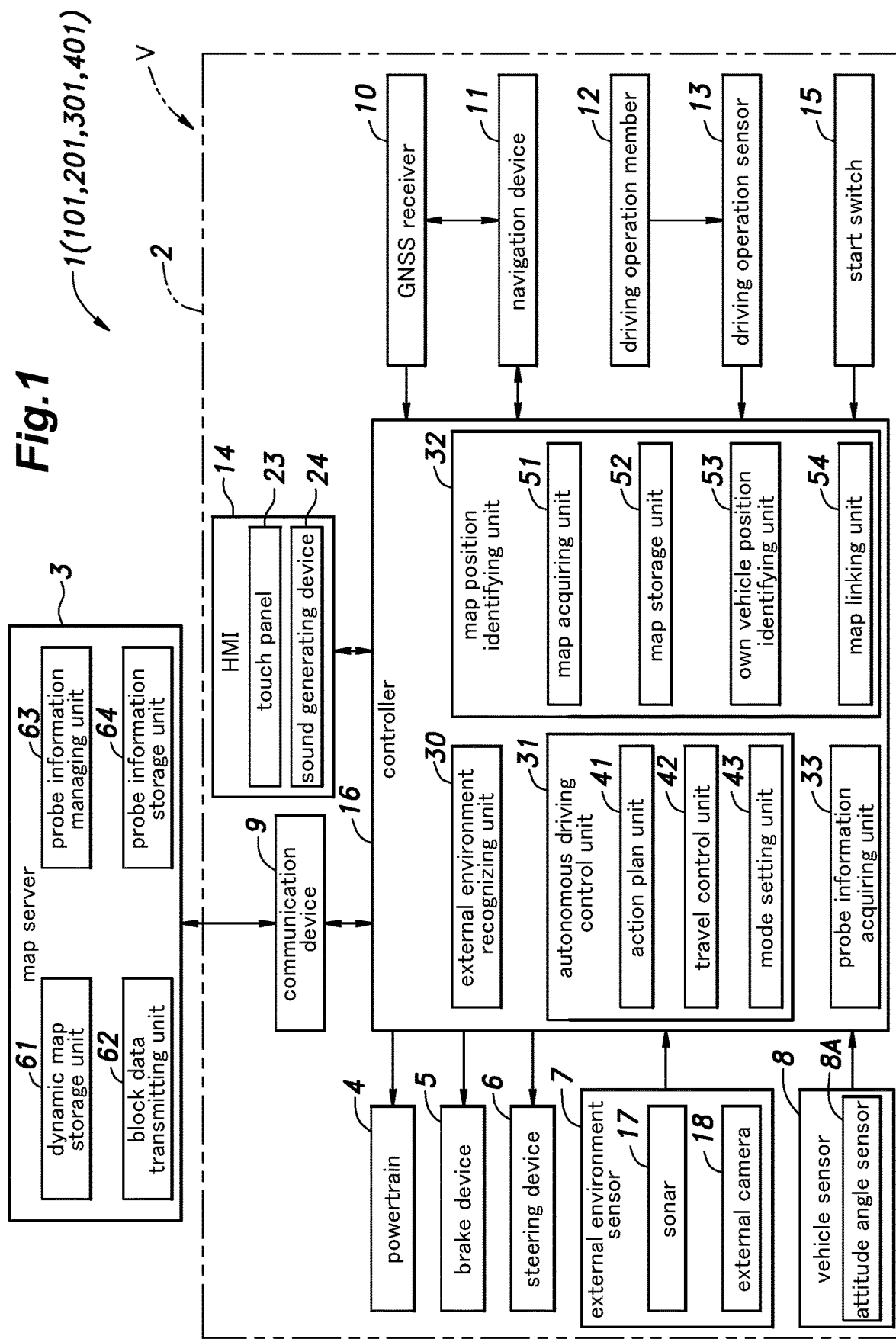
FIG. 1 is a functional block diagram showing the configuration of a map information system according to a first embodiment.

As shown in FIG. 1, the map information system 1 includes a vehicle system 2 mounted on a vehicle (see "V" in FIG. 1), and a map server 3 connected to the vehicle system 2 via a network.

<The Vehicle System>

First, the vehicle system 2 will be described. The vehicle system 2 includes a powertrain 4, a brake device 5, a steering device 6, an external environment sensor 7, a vehicle sensor 8, a communication device 9, a GNSS receiver 10, a navigation device 11, a driving operation member 12, a driving operation sensor 13, an HMI 14, a start switch 15, and a controller 16. Each component of the vehicle system 2 is connected to each other via a communication means such as Controller Area Network (CAN) such that signals can be transmitted therebetween.

The powertrain 4 is a device configured to apply a driving force to the vehicle. For example, the powertrain 4 includes at least one of an internal combustion engine (such as a gasoline engine and a diesel engine) and an electric motor. The brake device 5 is a device configured to apply a brake force to the vehicle. For example, the brake device 5 includes a brake caliper configured to press a pad against a brake rotor and an electric cylinder configured to supply an oil pressure to the brake caliper. The brake device 5 may further include a parking brake device configured to restrict rotation of wheels via wire cables. The steering device 6 is a device configured to change the steering angles of the wheels. For example, the steering device 6 includes a rack-and-pinion mechanism configured to steer the wheels and an electric motor configured to drive the rack-and-pinion mechanism. The powertrain 4, the brake device 5, and the steering device 6 are controlled by the controller 16.

The external environment sensor 7 is a sensor configured to detect an object outside the vehicle or the like by capturing electromagnetic waves, sound waves, or the like from the surroundings of the vehicle. The external environment sensor 7 includes a plurality of sonars 17 and a plurality of external cameras 18. The external environment sensor 7 may further include a millimeter wave radar and/or a laser lidar. The external environment sensor 7 is configured to output a detection result to the controller 16.

Each sonar 17 consists of a so-called ultrasonic sensor. The sonar 17 emits ultrasonic waves to the surroundings of the vehicle and captures the reflected waves therefrom, thereby detecting a position (distance and direction) of the object. The plurality of sonars 17 are provided at a rear part and a front part of the vehicle, respectively.

Each external camera 18 is a device configured to capture an image of the surroundings of the vehicle. For example, the external camera 18 is a digital camera that uses a solid imaging element such as a CCD and a CMOS. The external camera 18 may consist of a stereo camera or a monocular camera. The plurality of external cameras 18 include a front camera configured to capture an image in front of the vehicle, a rear camera configured to capture an image behind the vehicle, and a pair of side cameras configured to capture images on both lateral sides of the vehicle.

The vehicle sensor 8 is a sensor configured to detect the state of the vehicle. The vehicle sensor 8 includes a vehicle speed sensor configured to detect the speed of the vehicle, an acceleration sensor configured to detect the front-and-rear acceleration and the lateral acceleration of the vehicle, a yaw rate sensor configured to detect the angular velocity around a yaw axis of the vehicle, a direction sensor configured to detect the direction of the vehicle, and the like. For example, the yaw rate sensor may consist of a gyro sensor. The vehicle sensor 8 may further include an inclination sensor configured to detect the inclination of a vehicle body and a wheel speed sensor configured to detect the rotational speed of each wheel.

In the present embodiment, the vehicle sensor 8 includes a 6-axis inertial measurement unit (IMU) configured to detect the front-and-rear acceleration, the lateral acceleration, the vertical acceleration, the roll rate (the angular velocity around a roll axis), the pitch rate (the angular velocity around a pitch axis), and the yaw rate (the angular velocity around a yaw axis).

The communication device 9 is configured to mediate communication between the controller 16 and a device (for example, the map server 3) outside the vehicle. The communication device 9 includes a router configured to connect the controller 16 to the Internet. The communication device 9 may have a wireless communication function of mediating wireless communication between the controller 16 (namely, the controller 16 of the own vehicle) and the controller of the surrounding vehicle and between the controller 16 and a roadside device on a road.

The GNSS receiver 10 (the own vehicle position identifying device) is configured to receive a signal (hereinafter referred to as "the GNSS signal") from each of positioning satellites that constitute a Global Navigation Satellite System (GNSS). The GNSS receiver 10 is configured to output the received GNSS signal to the navigation device 11 and the controller 16.

The navigation device 11 consists of a computer provided with known hardware. The navigation device 11 is configured to identify the current position (latitude and longitude) of the vehicle based on the previous travel history of the vehicle and the GNSS signal outputted from the GNSS receiver 10. The navigation device 11 is configured to store data (hereinafter referred to as "the navigation map data") on roads of a region or a country on which the vehicle is traveling. The navigation device 11 is configured to store the navigation map data in a RAM, an HDD, an SSD, or the like.

The navigation device 11 is configured to set, based on the GNSS signal and the navigation map data, a route from a current position of the vehicle to a destination input by an occupant, and output the route to the controller 16. When the vehicle starts traveling, the navigation device 11 provides the occupant with route guidance to the destination.

Figure 2A:
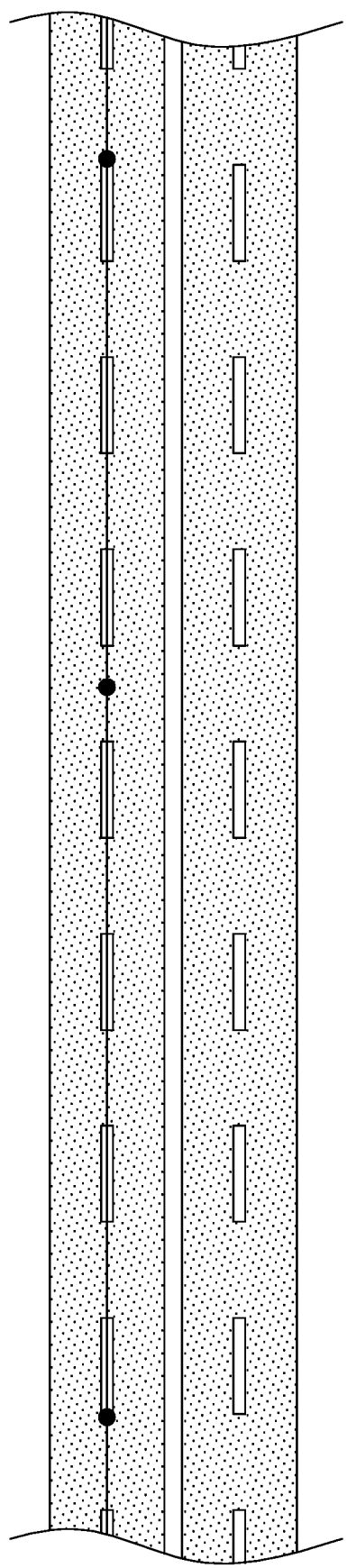
FIG. 2A is an explanatory diagram for explaining a map stored in a navigation device.

As shown in FIG. 2A, the navigation device 11 is configured to store, as information on roads on a map, information on points (nodes: see black circles in FIG. 2A) arranged on each road and line segments (links) connecting the nodes.

For example, each node stored in the navigation device 11 may be provided at a characteristic point such as an intersection or a merging point. The navigation device 11 is configured to store each link in association with a distance between the nodes connected by the link. The navigation device 11 is configured to acquire an appropriate route from the current position of the vehicle to the destination based on the distances between the nodes, and output information indicating the route to the controller 16. The outputted information indicating the route includes the points (nodes) on the road corresponding to the route and the links corresponding to vectors connecting the nodes.

The driving operation member 12 is provided in a vehicle cabin and configured to accept an input operation the occupant performs to control the vehicle. The driving operation member 12 includes a steering wheel, an accelerator pedal, and a brake pedal. The driving operation member 12 may further include a shift lever, a parking brake lever, a turn signal lever, and the like.

The driving operation sensor 13 is a sensor configured to detect an operation amount of the driving operation member 12. The driving operation sensor 13 includes a steering angle sensor configured to detect an operation amount of the steering wheel, an accelerator sensor configured to detect an operation amount of the accelerator pedal, and a brake sensor configured to detect an operation amount of the brake pedal. The driving operation sensor 13 is configured to output the detected operation amount to the controller 16. The driving operation sensor 13 may further include a grip sensor configured to detect that the occupant grips the steering wheel. For example, the grip sensor consists of at least one capacitive sensor provided on an outer circumferential portion of the steering wheel.

The HMI 14 is configured to notify the occupant of various kinds of information by display and/or voice, and accept an input operation by the occupant. For example, the HMI 14 includes a touch panel 23 and a sound generating device 24. The touch panel 23 includes a liquid crystal display, an organic EL display, or the like, and is configured to accept the input operation by the occupant. The sound generating device 24 consists of a buzzer and/or a speaker. The HMI 14 is configured to display a driving mode switch button on the touch panel 23. The driving mode switch button is a button configured to accept a switching operation of a driving mode (for example, an autonomous driving mode and a manual driving mode) of the vehicle by the occupant.

The HMI 14 also functions as an interface to mediate the input to/the output from the navigation device 11. Namely, when the HMI 14 accepts the input operation of the destination by the occupant, the navigation device 11 starts a route setting to the destination. Further, when the navigation device 11 provides the route guidance to the destination, the HMI 14 displays the current position of the vehicle and the route to the destination.

The start switch 15 is a switch for starting the vehicle system 2. Namely, the occupant presses the start switch 15 while sitting on the driver's seat and pressing the brake pedal, and thus the vehicle system 2 is started.

The controller 16 consists of at least one electronic control unit (ECU) including a CPU, a ROM, a RAM, and the like. The CPU executes operation processing according to a program, and thus the controller 16 executes various types of vehicle control. The controller 16 may consist of one piece of hardware, or may consist of a unit including plural pieces of hardware. The functions of the controller 16 may be at least partially executed by hardware such as an LSI, an ASIC, and an FPGA, or may be executed by a combination of software and hardware.

<The Controller>

As shown in FIG. 1, the controller 16 includes an external environment recognizing unit 30, an autonomous driving control unit 31 (ADAS: Advanced Driver-Assistance Systems), a map position identifying unit 32 (MPU: Map Positioning Unit), and a probe information acquiring unit 33. These components may be composed of separate electronic control units and connected to each other via a gateway (central gateway: CGW). Alternatively, these components may be composed of an integrated electronic control unit.

The external environment recognizing unit 30 is configured to recognize an object that is present in the surroundings of the vehicle based on the detection result of the external environment sensor 7, and thus acquire information on the position and size of the object. The object recognized by the external environment recognizing unit 30 includes delimiting lines, lanes, road ends, road shoulders, and obstacles, which are present on the travel route of the vehicle.

Each delimiting line is a line shown along a vehicle travel direction. Each lane is an area delimited by one or more delimiting lines. Each road end is an end of the road. Each road shoulder is an area between the delimiting line arranged at an end in the vehicle width direction and the road end. For example, each obstacle may be a barrier (guardrail), a utility pole, a surrounding vehicle, a pedestrian, or the like.

The external environment recognizing unit 30 is configured to recognize the position of the object around the vehicle with respect to the vehicle by analyzing the image captured by each external camera 18. For example, the external environment recognizing unit 30 may recognize the distance and direction from the vehicle to the object in a top view around the vehicle body by using a known method such as a triangulation method or a motion stereo method. Further, the external environment recognizing unit 30 is configured to analyze the image captured by the external camera 18, and determine the type (for example, the delimiting line, the lane, the road end, the road shoulder, the obstacle, or the like) of each object based on a known method.

The autonomous driving control unit 31 includes an action plan unit 41, a travel control unit 42, and a mode setting unit 43.

The action plan unit 41 is configured to create an action plan for causing the vehicle to travel. The action plan unit 41 is configured to output a travel control signal corresponding to the created action plan to the travel control unit 42.

The travel control unit 42 is configured to control the powertrain 4, the brake device 5, and the steering device 6 based on the travel control signal from the action plan unit 41. Namely, the travel control unit 42 is configured to cause the vehicle to travel according to the action plan created by the action plan unit 41.

The mode setting unit 43 is configured to switch the driving mode of the vehicle between the manual driving mode and the autonomous driving mode based on the input operation (switching operation) on the HMI 14. In the manual driving mode, the travel control unit 42 controls the powertrain 4, the brake device 5, and the steering device 6 in response to the input operation on the driving operation member 12 (for example, the steering wheel, the accelerator pedal and/or the brake pedal) by the occupant, thereby causing the vehicle to travel. On the other hand, in the autonomous driving mode, the occupant does not need to perform the input operation on the driving operation member 12, and the travel control unit 42 controls the powertrain 4, the brake device 5, and the steering device 6, thereby causing the vehicle to travel autonomously. Namely, a driving automation level of the autonomous driving mode is higher than that of the manual driving mode.

The map position identifying unit 32 includes a map acquiring unit 51, a map storage unit 52, an own vehicle position identifying unit 53, and a map linking unit 54.

The map acquiring unit 51 is configured to access the map server 3 and acquire dynamic map data, which is high-precision map information, from the map server 3. For example, as the navigation device 11 sets the route, the map acquiring unit 51 acquires the latest dynamic map data of an area corresponding to the route from the map server 3 via the communication device 9.

The dynamic map data is more detailed than the navigation map data stored in the navigation device 11, and includes static information, semi-static information, semi-dynamic information, and dynamic information. The static information includes 3D map data that is more precise than the navigation map data. The semi-static information includes traffic regulation information, road construction information, and wide area weather information. The semi-dynamic information includes accident information, traffic congestion information, and small area weather information. The dynamic information includes signal information, surrounding vehicle information, and pedestrian information.

Figure 2B:
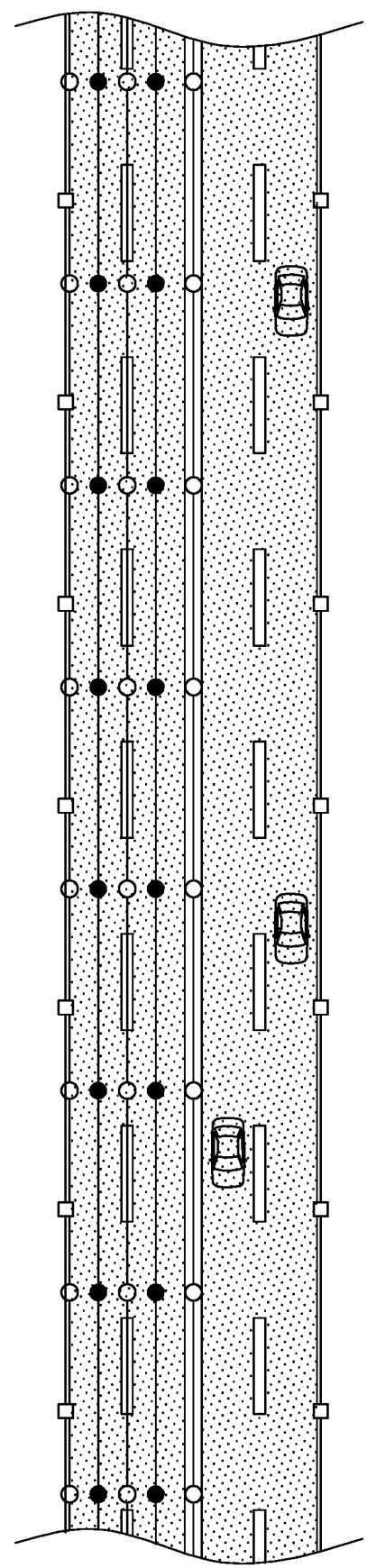
FIG. 2B is an explanatory diagram for explaining data of a high-precision map.

As shown in FIG. 2B, the static information (the high-precision map) of the dynamic map data includes information on the lanes (for example, the number of lanes) on the travel route and information on each delimiting line (for example, the type of the delimiting line) on the travel route. For example, the delimiting line of the static information is expressed as nodes (see white circles in FIG. 2B) arranged at smaller intervals than the nodes of the navigation map data and links connecting the nodes.

Further, each roadway of the static information is also expressed as nodes (hereinafter referred to as "the roadway nodes": see black circles in FIG. 2B) arranged at prescribed intervals and links (hereinafter referred to as "the roadway links") connecting the nodes (the roadway nodes). Each roadway node is provided at the halfway point between each node of the delimiting line set on a left edge of the road and each node of the delimiting line set on a right edge of the road. The roadway nodes are provided at prescribed intervals along the road.

The high-precision map (the static information) further includes information on road shoulder edges. Each road shoulder edge is an end of the roadway on which the vehicle travels. When the roadway and a sidewalk are provided, the road shoulder edge means a boundary therebetween. The road shoulder edge of the static information is expressed as nodes (see white squares in FIG. 2B: hereinafter referred to as "the road shoulder edge nodes") arranged along the road shoulder edge at approximately the same intervals as the nodes of the delimiting line and links (hereinafter referred to as "the road shoulder edge links") connecting the nodes (the road shoulder nodes).

The map storage unit 52 includes a storage unit such as an HDD and an SSD. The map storage unit 52 is configured to store various kinds of information for causing the vehicle to travel autonomously in the autonomous driving mode. The map storage unit 52 is configured to store the dynamic map data acquired by the map acquiring unit 51 from the map server 3.

The own vehicle position identifying unit 53 is configured to identify the position (latitude and longitude) of the vehicle, namely the own vehicle position based on the GNSS signal received by the GNSS receiver 10.

The own vehicle position identifying unit 53 is configured to calculate a movement amount (a movement distance and a movement direction: hereinafter referred to as "the DR movement amount") of the vehicle by using dead reckoning (for example, odometry) based on a detection result of the vehicle sensor 8 (IMU or the like). For example, the own vehicle position identifying unit 53 is configured to identify the own vehicle position based on the DR movement amount when the GNSS signal cannot be received. Further, the own vehicle position identifying unit 53 may execute a process for improving the identification accuracy of the own vehicle position by correcting, based on the DR movement amount, the own vehicle position identified from the GNSS signal.

The map linking unit 54 is configured to extract, based on the route output from the navigation device 11, a corresponding route on the high-precision map stored in the map storage unit 52.

When the vehicle is given an instruction to start traveling autonomously, the action plan unit 41 creates a global action plan (for example, a lane change, merging, branching, or the like) based on the route extracted by the map linking unit 54. After that, when the vehicle starts traveling autonomously, the action plan unit 41 creates a more detailed action plan (for example, an action plan for avoiding danger or the like) based on the global action plan, the own vehicle position identified by the own vehicle position identifying unit 53, the object recognized by the external environment recognizing unit 30, the high-precision map stored in the map storage unit 52, or the like. The travel control unit 42 controls the travel of the vehicle based on the created detailed action plan.

The probe information acquiring unit 33 associates the own vehicle position, which is identified by the own vehicle position identifying unit 53 based on the GNSS signal, with the data detected by at least one of the external environment sensor 7, the vehicle sensor 8, and the driving operation sensor 13, thereby acquiring and storing the own vehicle position and the data as probe information.

The probe information acquiring unit 33 appropriately transmits the acquired probe information to the map server 3.

<The Map Server>

Next, the map server 3 will be described. As shown in FIG. 1, the map server 3 is connected to the controller 16 via the network (in the present embodiment, the Internet). The map server 3 is a computer including a CPU, a ROM, a RAM, and a storage unit such as an HDD and an SSD.

The dynamic map data is stored in the storage unit of the map server 3. The dynamic map data stored in the storage unit of the map server 3 covers a wider area than the dynamic map data stored in the map storage unit 52 of the controller 16. The dynamic map data includes a plurality of block data (partial map data) corresponding to each area on the map. Preferably, each of the block data corresponds to a rectangular area on the map divided in the latitude direction and the longitude direction.

Upon receiving a request for data from the controller 16 (the map acquiring unit 51) via the communication device 9, the map server 3 transmits the dynamic map (the dynamic map data) corresponding to the requested data to the corresponding controller 16. The transmitted data (the dynamic map data) may include the traffic congestion information, the weather information, and the like.

As shown in FIG. 1, the map server 3 includes a dynamic map storage unit 61, a block data transmitting unit 62, a probe information managing unit 63, and a probe information storage unit 64.

The dynamic map storage unit 61 consists of a storage unit, and is configured to store a dynamic map in an area wider than an area in which the vehicle travels. The block data transmitting unit 62 is configured to accept a transmission request for specific block data from the vehicle, and transmit the block data corresponding to the transmission request to the vehicle.

The probe information managing unit 63 is configured to receive the probe information appropriately transmitted from the vehicle. The probe information storage unit 64 is configured to store (hold) the probe information acquired (received) by the probe information managing unit 63. The probe information managing unit 63 appropriately executes statistical processing and the like based on the probe information stored in the probe information storage unit 64, thereby executing an updating process for updating the dynamic map.

Figure 3:
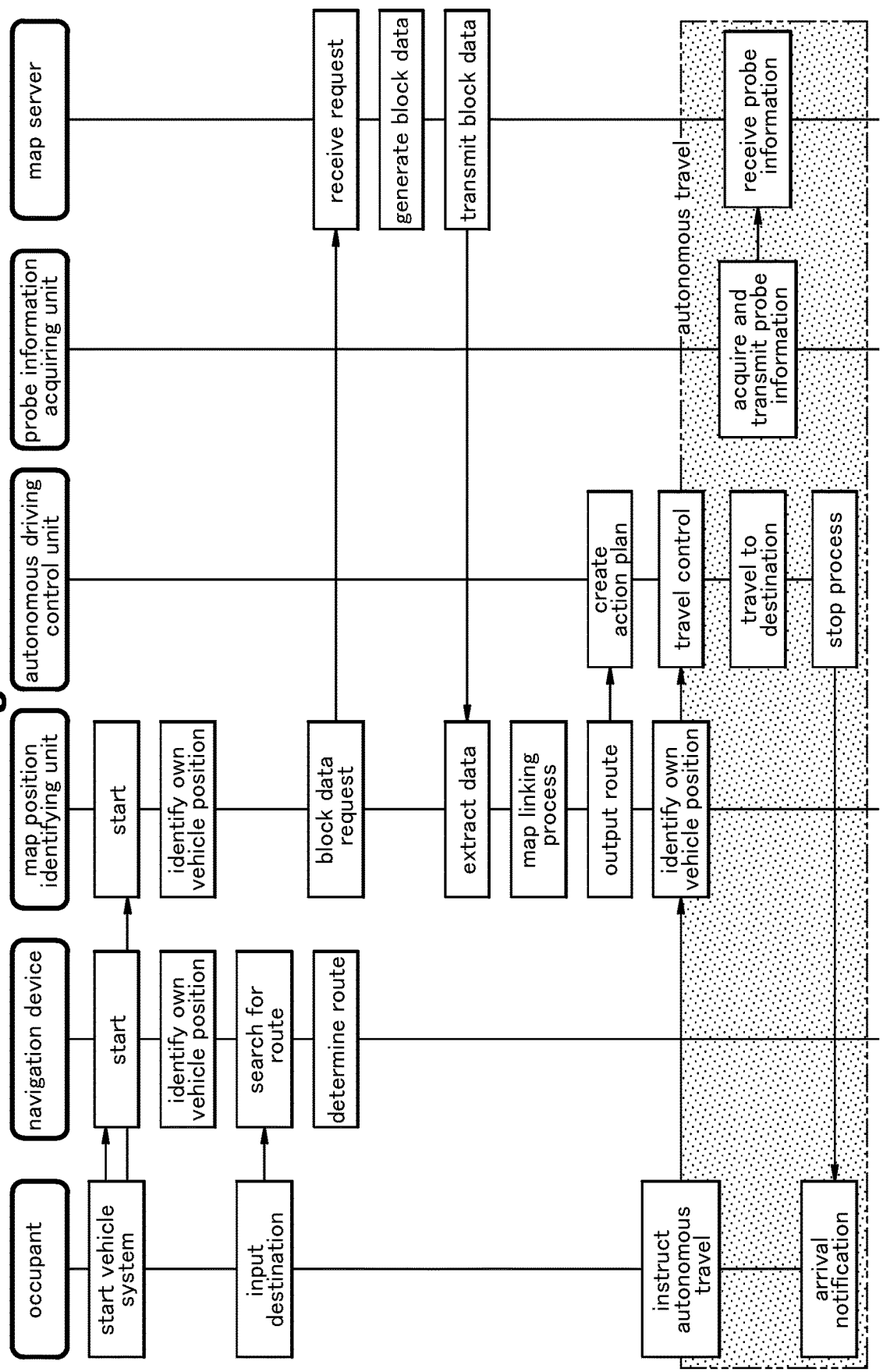
FIG. 3 is a sequence diagram for explaining the operation executed by the map information system in a case where a vehicle travels autonomously.

Next, the operation of the vehicle system 2 will be described. The vehicle system 2 is started as the occupant boards the vehicle and presses the start switch 15 while pressing the brake pedal. After that, as the occupant inputs the destination and makes an input to start autonomous travel to the HMI 14, the vehicle travels autonomously and arrives at the destination. FIG. 3 shows a sequence diagram from the start of the vehicle to the arrival at the destination. Hereinafter, the outline of the processing (operation) executed by the autonomous driving control unit 31, the map position identifying unit 32, the probe information acquiring unit 33, and the map server 3 when the vehicle travels autonomously and arrives at the destination will be described with reference to FIG. 3.

When the start switch 15 is pressed and the vehicle system 2 starts, the navigation device 11 and the map position identifying unit 32 each identify the own vehicle position based on the GNSS signal from the satellites.

After that, when the occupant inputs the destination to the HMI 14, the navigation device 11 searches for and determines the route from the current position to the destination based on the navigation map data.

After determining the route, the navigation device 11 outputs the determined route to the map position identifying unit 32. The map position identifying unit 32 requests the map server 3 to transmit the corresponding block data based on the acquired route.

Upon receiving the request (block data request) from the map position identifying unit 32, the map server 3 generates the corresponding block data based on the route set (determined) by the navigation device 11 and the position of the vehicle, and transmits the generated block data to the map position identifying unit 32 (the vehicle system 2).

Upon receiving the block data, the map position identifying unit 32 acquires (extracts) the data relating to the dynamic map around the vehicle from the block data. After that, the map position identifying unit 32 (the map linking unit 54) executes a map linking process and outputs, to the autonomous driving control unit 31, the route on the high-precision map corresponding to the route in the block data from the departure point to the destination set (determined) by the navigation device 11. After that, the autonomous driving control unit 31 (the action plan unit 41) creates the global action plan according to the route on the high-precision map.

When an input to instruct the vehicle to travel autonomously is made on the HMI 14, the map position identifying unit 32 identifies the own vehicle position, and the autonomous driving control unit 31 sequentially creates the more detailed action plan based on the identified own vehicle position, the position of the object recognized by the external environment recognizing unit 30, and the like. The autonomous driving control unit 31 (the travel control unit 42) controls the vehicle according to the created action plan, thereby causing the vehicle to travel autonomously.

When the vehicle starts traveling autonomously, the probe information acquiring unit 33 starts acquiring the probe information. While the vehicle is traveling, the probe information acquiring unit 33 appropriately transmits the acquired probe information to the map server 3 as the probe information during autonomous driving.

When the vehicle arrives at the destination, the autonomous driving control unit 31 executes a stop process for stopping the vehicle, and the HMI 14 displays a notification that the vehicle arrives at the destination.

While the vehicle is traveling autonomously, the map position identifying unit 32 (more specifically, the own vehicle position identifying unit 53) repeatedly executes a determining process. In the determining process, the map position identifying unit 32 estimates the position of the vehicle, and compares the information (hereinafter referred to as "the surrounding information") around the vehicle acquired by the external environment sensor 7 with the information (hereinafter referred to as "the map information") included in the dynamic map stored in the map storage unit 52, thereby determining whether the vehicle can travel autonomously and whether the map information matches the surrounding information. In the determining process, in a case where the map information does not match the surrounding information, the notification that the vehicle cannot travel autonomously and the map information does not match the surrounding information is transmitted to the map server 3.

In other words, the map information system 1 includes the vehicle configured to store the map information and travel autonomously based on the map information and the map server 3 configured to provide the vehicle with the map information. The map information system 1 is configured such that in a case where the map information does not match the surrounding information, the notification that the vehicle cannot travel autonomously and the map information does not match the surrounding information is transmitted to the map server 3.

Figure 4:
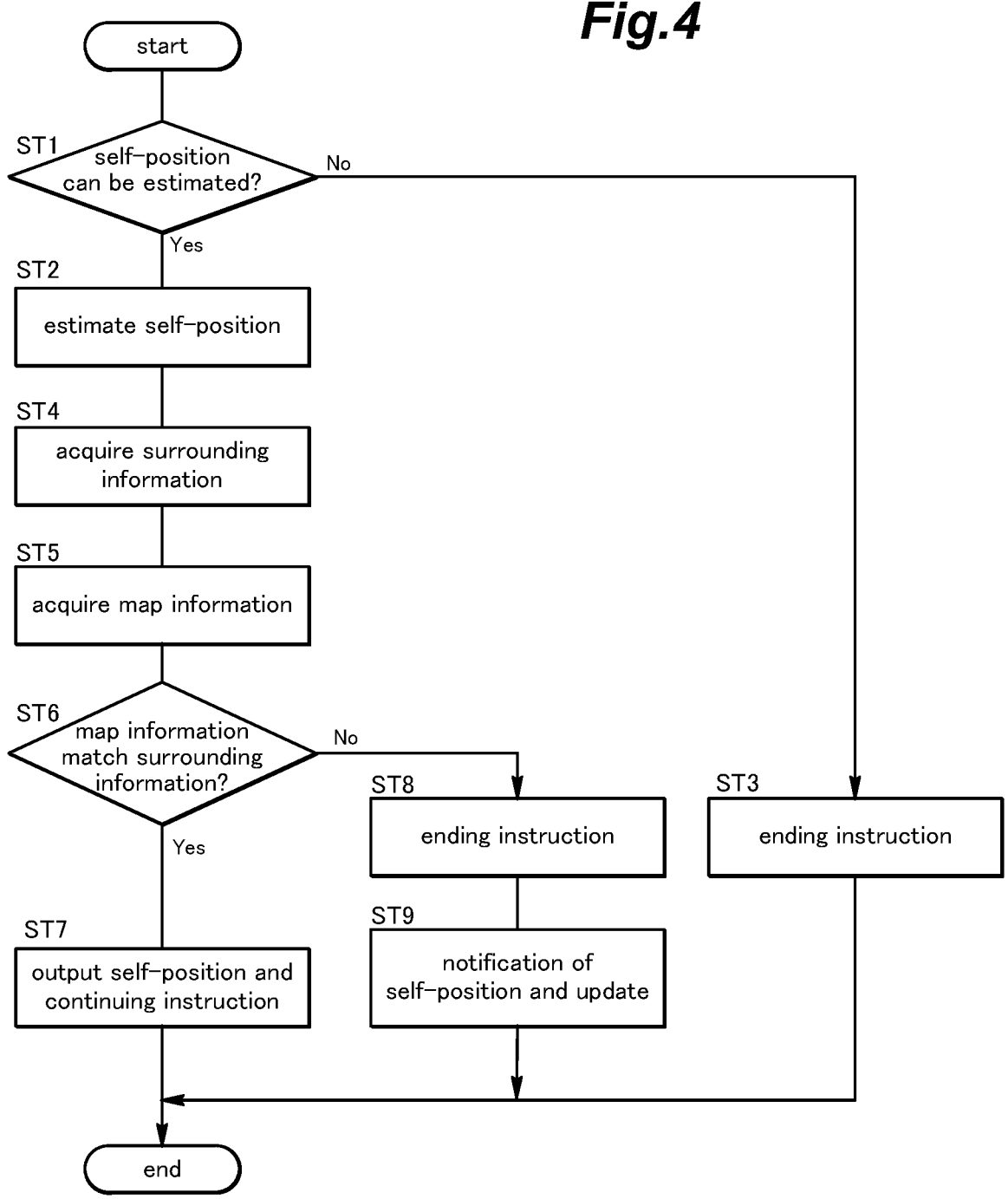
FIG. 4 is a flowchart of a determining process executed by a controller of the map information system according to the first embodiment.

Next, the details of the determining process executed by the map position identifying unit 32 will be described with reference to FIG. 4.

In the first step ST1 of the determining process, the map position identifying unit 32 (own vehicle position identifying unit 53) determines whether a self-position (the own vehicle position) can be estimated by using the GNSS signal or dead reckoning. More specifically, in a case where the GNSS receiver 10 can receive the signal (GNSS signal) with sufficient intensity from the positioning satellites, the map position identifying unit 32 determines that the self-position can be estimated. In a case where the GNSS receiver 10 cannot receive the signal (GNSS signal) with sufficient intensity from the positioning satellites, the map position identifying unit 32 determines whether the self-position can be estimated by calculating the movement amount of the vehicle by dead reckoning. The map position identifying unit 32 executes step ST2 in a case where the self-position can be estimated, and executes step ST3 in a case where the self-position cannot be estimated.

In step ST2, the map position identifying unit 32 estimates the own vehicle position (hereinafter sometimes referred to as "the self-position") based on a method (a method based on the GNSS signal or a method based on dead reckoning) that has been determined to be a method by which the self-position can be estimated in step ST1. More specifically, in a case where the GNSS signal can be received with sufficient intensity, the map position identifying unit 32 estimates the self-position based on the GNSS signal. In a case where the GNSS signal cannot be received with sufficient intensity or the GNSS signal cannot be received at all, the map position identifying unit 32 estimates the self-position by using dead reckoning. Upon completing the estimation of the self-position, the map position identifying unit 32 executes step ST4.

In step ST3, the map position identifying unit 32 outputs an ending instruction of the autonomous travel (an instruction to end the autonomous travel of the vehicle) to the autonomous driving control unit 31. Upon completing the output of the ending instruction, the map position identifying unit 32 ends the determining process.

In step ST4, the map position identifying unit 32 acquires an object from an image in front of the vehicle captured by each external camera 18. In the present embodiment, the object acquired by the map position identifying unit 32 includes positions of the delimiting lines, the road shoulder edges, and the road ends on the road. After that, the map position identifying unit 32 acquires, based on the position, size, or the like of the object in the image captured by the external camera 18, the surrounding information indicating the position (latitude and longitude) of the object around the vehicle by using the self-position acquired (estimated) in step ST3.

The surrounding information includes information on the shape of the road and information on road markings estimated from the image captured (acquired) by each external camera 18. More specifically, the surrounding information includes the positions of the road ends and the road shoulder edges as the information on the shape of the road, and also includes the positions of the delimiting lines as the information on the road markings. Further, in the present embodiment, the surrounding information includes the traveling direction of the surrounding vehicle.

Upon completing the acquisition of the surrounding information, the map position identifying unit 32 executes step ST5.

In step ST5, the map position identifying unit 32 acquires the map information around the vehicle by using the self-position estimated in step ST2 and the dynamic map (high-precision map) stored in the map storage unit 52. In the present embodiment, the map information is information acquired by cutting out the surroundings of the self-position estimated from the high-precision map. For example, the map information includes the road shoulder edge links corresponding to each road shoulder edge of the road in front of the vehicle, the position of each road end, the lane links corresponding to each lane on the road in front of the vehicle, attribute information corresponding to each lane link, or the like, which can be acquired by the external environment sensor 7 (external cameras 18) mounted on the vehicle. The map information includes the positions (a starting point and an ending point) of the lane links, and each lane is expressed as a group of lane links. That is, the map information includes positional information on the lanes. The attribute information includes the travel direction corresponding to each lane. Upon completing the acquisition of the map information, the map position identifying unit 32 executes step ST6.

In step ST6, the map position identifying unit 32 determines whether the map information matches the surrounding information. More specifically, in step ST6, the map position identifying unit 32 determines whether main information of the map information matches that of the surrounding information. The main information is information required for the autonomous travel of the vehicle. The main information includes the shape of the road, the travel direction, and the number of lanes.

More specifically, the map position identifying unit 32 first determines whether the information on the shape of the road included in the map information matches the shape of the road included in the surrounding information. More specifically, the map position identifying unit 32 first determines whether each road end included in the surrounding information is arranged on the corresponding road end included in the map information by superimposing the position of the road end included in the surrounding information on the position of the road end included in the map information.

The map position identifying unit 32 may determine whether the information on the shape of the road included in the map information matches the shape of the road included in the surrounding information by determining whether the position of each road shoulder edge included in the map information matches the position of the corresponding road shoulder edge included in the surrounding information. More specifically, the map position identifying unit 32 may determine whether the information on the shape of the road included in the map information matches the shape of the road included in the surrounding information by determining whether the position of each road shoulder edge included in the surrounding information overlaps with the road shoulder edge link indicating the corresponding road shoulder edge included in the map information.

Furthermore, the map position identifying unit 32 acquires the number of lanes in front of the vehicle based on the delimiting lines of the surrounding information, and determines whether the acquired number of lanes matches the number of lanes in front of the vehicle included in the map information.

Further, the map position identifying unit 32 determines whether the behavior of the surrounding vehicle included in the surrounding information matches the travel direction of each lane link included in the map information (attribute information). For example, the behavior of the surrounding vehicle does not match the travel direction of the lane link in a case where the vehicle cannot move forward due to an accident or the like and thus moves backward or in a case where the map information is incorrect and thus the vehicle is recognized as traveling reversely (traveling on a wrong side).

In a case where the information on the shape of the road included in the map information matches the shape of the road included in the surrounding information, the number of lanes acquired from the surrounding information matches the number of lanes included in the map information, and the behavior of the surrounding vehicle included in the surrounding information matches the travel direction of each lane link included in the map information, the map position identifying unit 32 determines that the map information matches the surrounding information, and thus executes step ST7. Otherwise, the map position identifying unit 32 executes step ST8.

In step ST7, the map position identifying unit 32 determines that the travel control based on the map information and the surrounding information can be executed, and outputs the self-position (the own vehicle position) estimated in step ST2 and a continuing instruction of the autonomous travel (an instruction to continue the autonomous travel of the vehicle) to the autonomous driving control unit 31. Upon completing the output of the self-position and the continuing instruction, the map position identifying unit 32 ends step ST7 and the determining process.

In step ST8, the map position identifying unit 32 determines that the travel control based on the map information and the surrounding information cannot be executed, and outputs the ending instruction of the autonomous travel to the autonomous driving control unit 31. Upon completing the output of the ending instruction, the map position identifying unit 32 executes step ST9.

In step ST9, the map position identifying unit 32 transmits (outputs), via the communication device 9, the self-position and a signal corresponding to a notification that the map information should be updated to the map server 3. That is, the map position identifying unit 32 notifies the map server 3 of the self-position and notifies the map server 3 that the map information should be updated. Upon completing the transmission thereof, the map position identifying unit 32 ends the determining process.

Upon receiving the ending instruction of the autonomous travel from the map position identifying unit 32, the autonomous driving control unit 31 causes the HMI 14 to give the notification that it becomes difficult for the vehicle to travel autonomously, and promptly transfers the operation authority of the vehicle to the occupant.

Upon receiving the notification that the map information should be updated, the map server 3 notifies the map information manager (map information operator), who manages and operates the map server 3, of the position of the vehicle that has given the notification and notifies the map information manager that the map information should be updated. For example, the map server 3 may include a monitor that presents information to the map information manager, and cause the monitor to display the position of the vehicle that has given the notification and the notification that the map information should be updated upon receiving the notification that the map information should be updated. Further, the map server 3 may cause a terminal (a smartphone, a tablet, or the like) carried by the map information manager to display the position of the vehicle that has given the notification and the notification that the map information should be updated.

Next, the operation and effect of the map information system 1 with the above configurations will be described. The map position identifying unit 32 repeatedly executes the determining process while the vehicle is traveling autonomously.

In a case where the self-position cannot be estimated (for example, in a case where the GNSS signal cannot be received and the acceleration/deceleration of the vehicle cannot be detected) (No in step ST1), the ending instruction of the autonomous travel is given (step ST3), and the operation authority of the vehicle is transferred to the occupant.

On the other hand, in a case where the self-position can be estimated (Yes in step ST1) but the map information does not match the surrounding information (No in step ST6), the ending instruction of the autonomous travel is given (step ST8), and the map server 3 is notified of the self-position and notified that the map information should be updated (step ST9). The map server 3 notifies the map information manager of the position of the vehicle that has given the notification and notifies the map information manager that the map information should be updated.

Accordingly, upon receiving the notification thereof, the map information manager can move to the position of the vehicle that has given the notification and conduct a road survey or the like, thereby determining whether the map information matches an actual road. Accordingly, the map information manager can determine whether the map information should be updated, so that it is possible to improve the accuracy of the determination as to whether the map information should be updated, as compared with a case where the map information manager determines whether the map information should be updated based only on the probe information on the vehicle.

Further, the map position identifying unit 32 can identify the self-position based on the GNSS signal received by the GNSS receiver 10, and the autonomous driving control unit 31 can cause the vehicle to travel autonomously based on the self-position and the map information (the second travel control of the vehicle). Further, the map position identifying unit 32 can calculate the DR movement amount by using the detection result of the vehicle sensor 8 (IMU) so as to estimate the self-position, and the autonomous driving control unit 31 can cause the vehicle to travel autonomously based on the self-position and the map information (the first travel control of the vehicle). In this way, the autonomous driving control unit 31 can cause the vehicle to travel autonomously by two types of travel control, so that redundancy of the travel control can be enhanced.

Further, in a case where the map information does not match the surrounding information based on the detection result of the external environment sensor 7 (No in step ST6), the autonomous travel of the vehicle ends. Accordingly, it is possible to prevent the vehicle from traveling autonomously based on the map information (for example, previous map information) that does not reflect an actual state around the vehicle, so that the safety of the vehicle can be enhanced.

Further, even if the GNSS signal becomes unreceivable, the map server 3 is not notified that the map information should be updated as long as the vehicle can travel autonomously (Yes in step ST1) and the map information matches the surrounding information (Yes in step ST6). Accordingly, it is possible to prevent the map server 3 from being notified that the map information should be updated each time the GNSS signal becomes unreceivable (for example, each time the vehicle enters a tunnel).

Further, the map position identifying unit 32 determines whether the map information matches the surrounding information by determining that the position of each road end, the position of each road shoulder edge, the number of lanes, and the behavior of the surrounding vehicle of the former match those of the latter. Accordingly, it is possible to easily determine that the map information does not match an actual state around the vehicle, and notify the map information manager of the mismatch thereof in a case where the map information does not match the actual state around the vehicle.

The Second Embodiment

Figure 5:
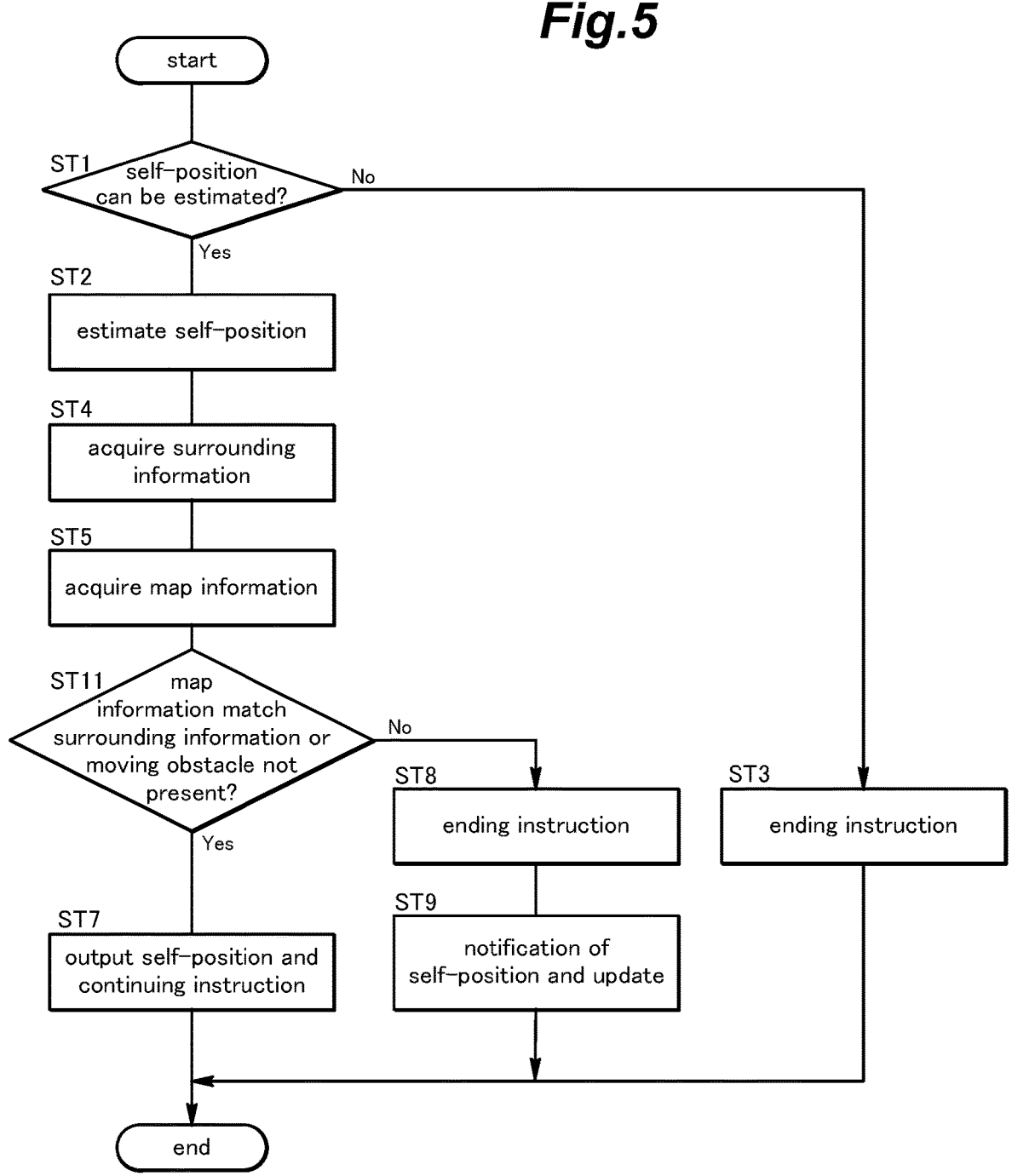
FIG. 5 is a flowchart of a determining process executed by a controller of a map information system according to a second embodiment.

The map information system 101 according to a second embodiment differs from the map information system 1 according to the first embodiment in that, as shown in FIG. 5, the map position identifying unit 32 executes step ST11 instead of step ST6 in the determining process. With respect to other configurations, the second embodiment is substantially the same as the first embodiment, and thus the description of other configurations will be omitted.

In step ST11, the map position identifying unit 32 not only determines whether the map information matches the surrounding information but also extracts an area (hereinafter referred to as "the mismatch area") where the map information does not match the surrounding information and determines whether a moving object (hereinafter referred to as "the moving obstacle") is present in the mismatch area based on the detection result of the external environment sensor 7 (in the present embodiment, the external cameras 18).

In a case where the map information matches the surrounding information or the moving obstacle is not present in the mismatch area, the map position identifying unit 32 determines that the travel control based on the map information and the surrounding information can be executed, and thus executes step ST7. In a case where the map information does not match the surrounding information and the moving obstacle is present in the mismatch area, the map position identifying unit 32 determines that the travel control based on the map information and the surrounding information cannot be executed, and executes step ST8.

Accordingly, in a case where the map information does not match the surrounding information and the moving obstacle is present in the area (the mismatch area) where the map information does not match the surrounding information, the travel control based on the map information and the surrounding information is stopped and the operation authority of the vehicle is transferred to the occupant. Accordingly, the safety of the vehicle can be enhanced. Further, even if the map information does not match the surrounding information, the autonomous travel of the vehicle is continued as long as the moving obstacle is not present in the mismatch area, so that the convenience of the vehicle is enhanced.

The Third Embodiment

Figure 6:
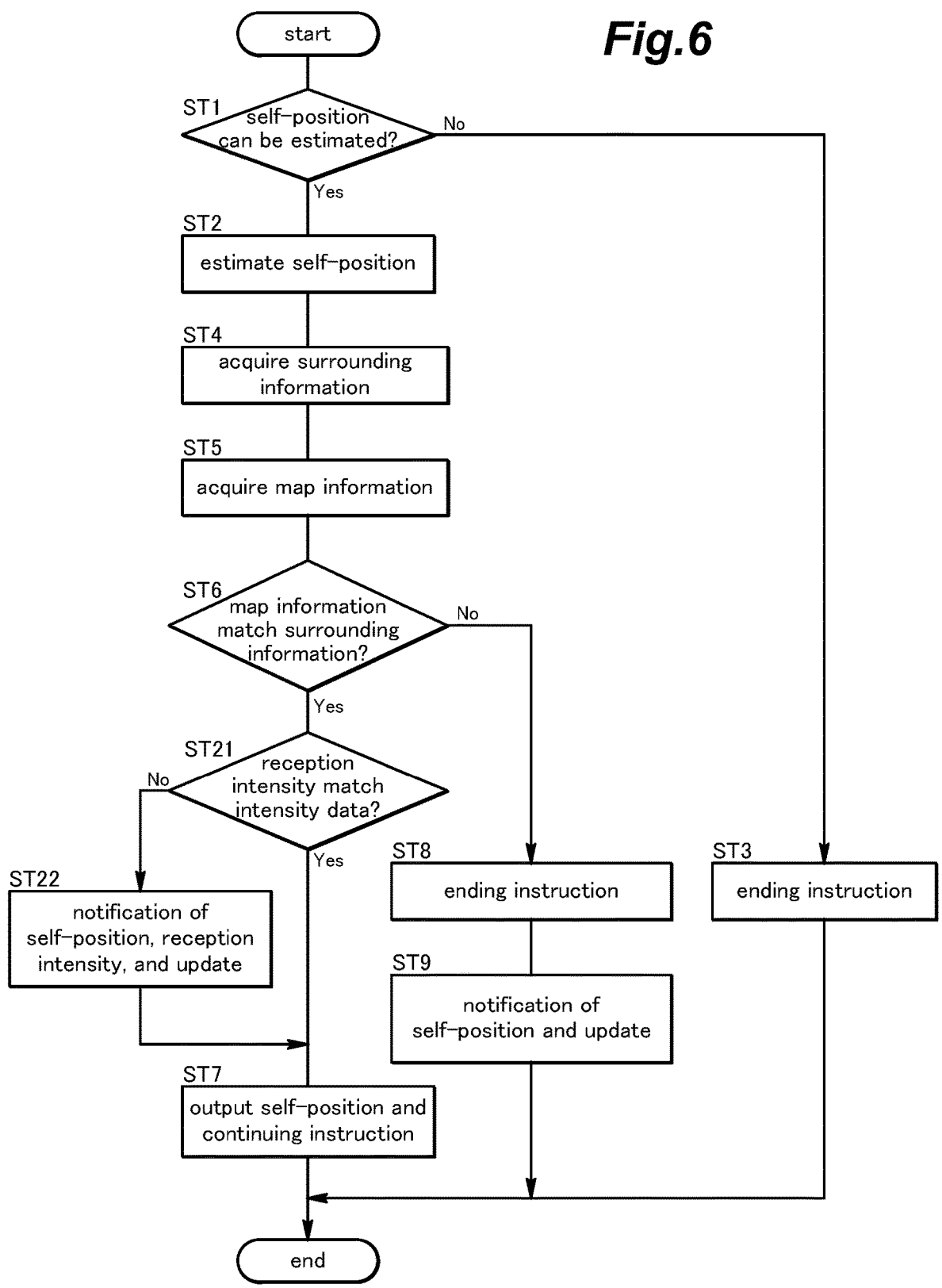
FIG. 6 is a flowchart of a determining process executed by a controller of a map information system according to a third embodiment.

The map information system 201 according to a third embodiment differs from the map information system 1 according to the first embodiment in that, as shown in FIG. 6, the determining process executed by the map position identifying unit 32 includes steps ST21 and ST22, and in that the dynamic map data includes additional information on the high-precision map. With respect to other configurations, the third embodiment is substantially the same as the first embodiment, and thus the description of other configurations will be omitted.

The additional information on the high-precision map is not so important that the autonomous travel of the vehicle becomes impossible without sufficient additional information. However, it is desirable that the additional information is acquired to improve the travel controllability and the energy efficiency of the vehicle. For example, the additional information includes the semi-static information and/or the semi-dynamic information such as the traffic congestion information on each lane and the weather information.

In the present embodiment, the dynamic map data includes, as the additional information on the high-precision map, the data (hereinafter referred to as "the intensity data") of reception intensity of the GNSS signal on each lane link. The intensity data is associated with each lane link. When the vehicle starts traveling, the map position identifying unit 32 acquires the additional information together with the high-precision map of the travel route of the vehicle. When the vehicle is traveling, the map storage unit 52 stores the additional information corresponding to the travel route of the vehicle.

Even if the intensity data of the GNSS signal is insufficient, the map position identifying unit 32 selectively executes the estimation of the self-position based on the GNSS signal or the estimation of the self-position by odometry. Incidentally, it is possible to determine whether the GNSS signal can be received by using the intensity data, and thus the intensity data is useful for determining whether the self-position can be estimated and for improving the travel controllability of the vehicle.

In step ST6, in a case where the information on the shape of the road included in the map information matches the shape of the road included in the surrounding information, the number of lanes acquired from the surrounding information matches the number of lanes included in the map information, and the behavior of the surrounding vehicle included in the surrounding information matches the travel direction of each lane link included in the map information, the map position identifying unit 32 executes step ST21. Otherwise, the map position identifying unit 32 executes step ST8.

In step ST21, the map position identifying unit 32 acquires the reception intensity of the GNSS signal received by the GNSS receiver 10. After that, the map position identifying unit 32 acquires the lane link of the lane in which the vehicle is currently traveling based on the self-position identified by the own vehicle position identifying unit 53 and the high-precision map stored in the map storage unit 52. After that, the map position identifying unit 32 acquires the intensity data corresponding to the lane link from the additional information stored in the map storage unit 52, and determines whether the reception intensity of the GNSS signal matches the intensity data. The map position identifying unit 32 executes step ST7 in a case where the reception intensity thereof matches the intensity data, and executes step ST22 in a case where the reception intensity thereof does not match the intensity data.

In step ST22, the map position identifying unit 32 transmits, via the communication device 9, a signal corresponding to the notification that the map information should be updated to the map server 3 together with the probe information including the self-position and the reception intensity of the GNSS signal. That is, the map position identifying unit 32 notifies the map server 3 of the self-position and the reception intensity of the GNSS signal, and notifies the map server 3 that the map information should be updated. Upon completing the transmission thereof, the map position identifying unit 32 executes step ST7.

The map server 3 gives the notification corresponding to the notification transmitted in step ST22 to the map information manager.

Next, the effect of the map information system 201 with the above configurations will be described. The map position identifying unit 32 determines whether the intensity of the GNSS signal that can be actually received by the GNSS receiver 10 matches the reception intensity of the GNSS signal as the additional information (step ST21). When the former does not match the latter, the map server 3 is notified that the map information should be updated (step ST22). Accordingly, it is possible to notify the map server 3 that the additional information does not reflect an actual state. Further, the map server 3 gives the notification to the map information manager, so that the map information manager can easily recognize that the state around the road has changed.

Incidentally, the map server 3 may automatically update the additional information included in the dynamic map data based on the self-position and the reception intensity included not in the notification transmitted in step ST9 but in the notification transmitted in step ST22. According to such a configuration, the data included in the dynamic map (in particular, the data that is variable and desirably acquired to improve the travel controllability and the energy efficiency) can be quickly changed based on the probe information transmitted from the vehicle.

The Fourth Embodiment

Figure 7:
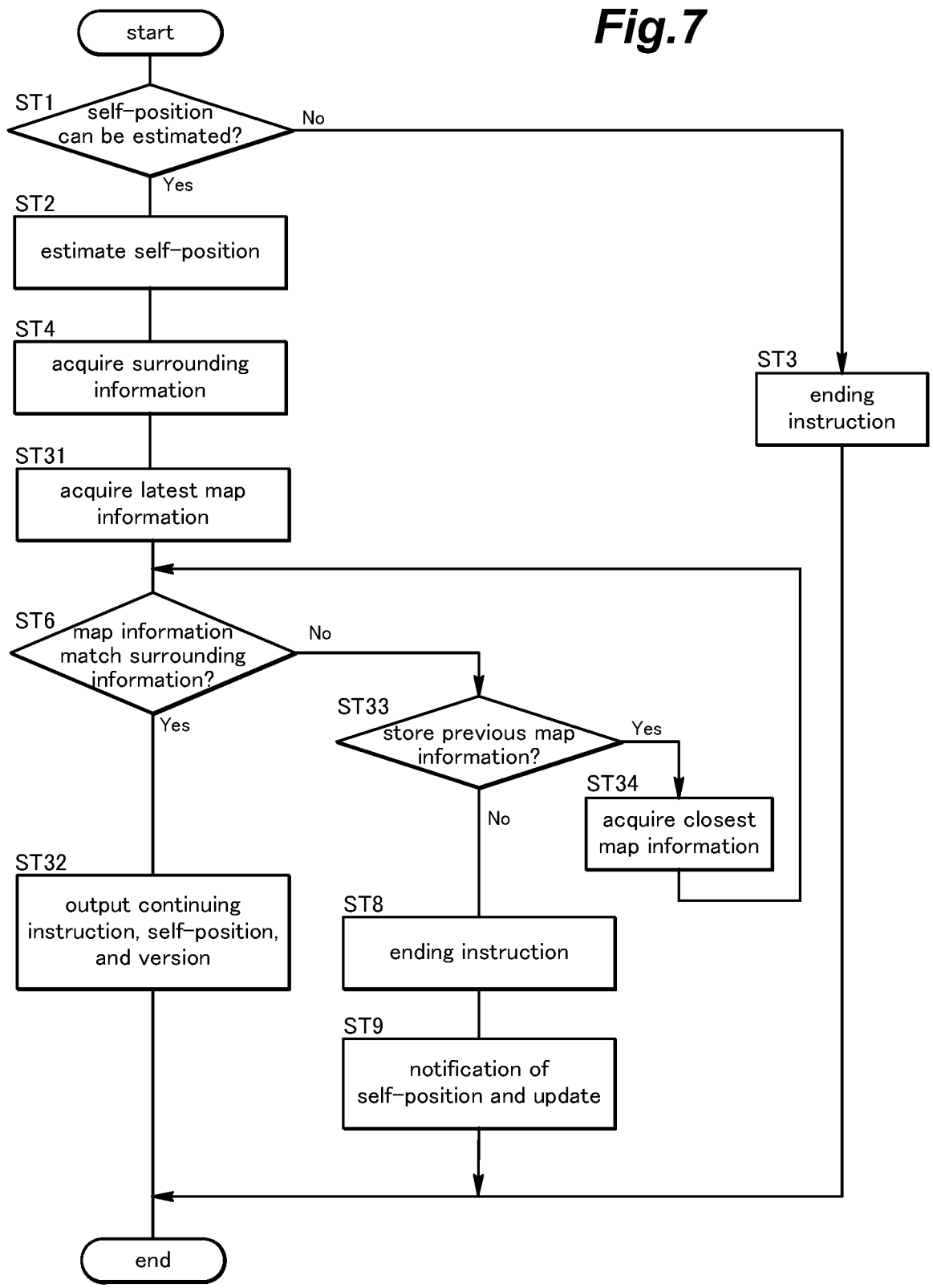
FIG. 7 is a flowchart of a determining process executed by a controller of a map information system according to a fourth embodiment.

The map information system 301 according to the fourth embodiment differs from the map information system 1 according to the first embodiment in that, as shown in FIG. 7, step ST31 is executed instead of step ST5, step ST32 is executed instead of step ST7, and steps ST33 and ST34 are added in the determining process executed by the map position identifying unit 32. Further, the map information system 301 according to the fourth embodiment differs from the map information system 1 according to the first embodiment in that the map server 3 stores plural versions of dynamic map data generated at different periods, and in that the map storage unit 52 stores the corresponding map information. With respect to other configurations, the fourth embodiment is substantially the same as the first embodiment, and thus the description of other configurations will be omitted.

In step ST31, the map position identifying unit 32 acquires the latest map information around the vehicle in the same manner as the first embodiment by using the self-position estimated in step ST2 and the latest version of the dynamic map (that is, the dynamic map whose generation period is the latest) stored in the map storage unit 52. Upon completing the acquisition of the latest map information, the map position identifying unit 32 executes step ST6.

The map position identifying unit 32 executes step ST32 upon determining in step ST6 that the map information (the latest map information) matches the surrounding information, and executes step ST33 upon determining in step ST6 that the map information (the latest map information) does not match the surrounding information.

In step ST32, the map position identifying unit 32 outputs, to the autonomous driving control unit 31, the continuing instruction of the autonomous travel, together with the self-position and the version of the map information that has matched the surrounding information in step ST6. Upon completing the output thereof, the map position identifying unit 32 ends the determining process. The autonomous driving control unit 31 executes the travel control of the vehicle by using the map information that has matched the surrounding information.

Further, in step ST32, the map position identifying unit 32 notifies the map server 3 that the map information should be updated when the map information that has matched the surrounding information is not the latest version.

In step ST33, the map position identifying unit 32 determines whether the map storage unit 52 stores the map information (that is, the previous map information) whose generation period is earlier than the map information compared with the surrounding information in step ST6. The map position identifying unit 32 executes step ST34 in a case where the map storage unit 52 stores the map information whose generation period is earlier than the map information compared with the surrounding information in step ST6, and executes step ST8 in a case where the map storage unit 52 does not store the above map information.

In step ST34, the map position identifying unit 32 acquires, from the map storage unit 52, the closest map information whose generation period is earlier than and the closest to the generation period of the map information compared with the surrounding information in step ST6. Upon completing the acquisition of the closest map information, the map position identifying unit 32 executes step ST6.

Next, the operation and effect of the map information system 301 with the above configurations will be described. The map position identifying unit 32 acquires the latest map information from the map storage unit 52 (step ST31), and compares the latest map information with the surrounding information (step ST6).

In a case where the latest map information does not match the surrounding information and the map storage unit 52 stores the second latest map information (Yes in step ST33), the map position identifying unit 32 acquires the second latest map information (step ST34), and determines whether the second latest map information matches the surrounding information (step ST6). In a case where the second latest map information does not match the surrounding information (No in step ST6) and the map storage unit 52 stores the third latest map information (Yes in step ST33), the map position identifying unit 32 acquires the third latest map information (step ST34) and compares the third latest map information with the surrounding information (step ST6).

In this way, the map position identifying unit 32 compares plural pieces of map information stored in the map storage unit 52 with the surrounding information in reverse chronological order. In a case where all the pieces of map information stored in the map storage unit 52 do not match the surrounding information, the map position identifying unit 32 outputs the ending instruction of the autonomous travel to the autonomous driving control unit 31 (step ST8).

When one of the plural pieces of map information matches the surrounding information, the map position identifying unit 32 outputs, together with the version of the one of the plural pieces of map information that matches the surrounding information, the continuing instruction of the autonomous travel to the autonomous driving control unit 31 (step ST32). Accordingly, the autonomous driving control unit 31 executes the travel control of the vehicle by using the map information that matches the surrounding information. In step ST32, the map position identifying unit 32 notifies the map server 3 that the map information should be updated when the one of the plural pieces of map information that matches the surrounding information is not the latest version.

Accordingly, even if the map information stored in the map server 3 is updated based on incorrect probe information, the travel control is executed based on the map information before the incorrect update that matches the surrounding information. Accordingly, it is possible to cause the vehicle to travel autonomously without depending on the map information updated incorrectly. Further, the notification is transmitted to the map server 3, so that the map information manager can appropriately determine whether the map information should be updated.

The Fifth Embodiment

The map information system 401 according to the fifth embodiment differs from the map information system 1 according to the first embodiment in that, as shown in FIG. 8, step ST41 is executed after step ST8 in the determining process executed by the map position identifying unit 32. With respect to other configurations, the fifth embodiment is substantially the same as the first embodiment, and thus the description of other configurations will be omitted.

In step ST41, the map position identifying unit 32 causes the HMI 14 (the input/output device) to give notification that the map information does not match the surrounding information and accept an input as to whether to give the notification to the map server 3. That is, the map position identifying unit 32 determines whether the occupant permits the notification to the map server 3. For example, the map position identifying unit 32 causes a display screen of the HMI 14 to display a permission button corresponding to permission of the notification to the map server 3 and a non-permission button corresponding to non-permission (prohibition) of the notification thereto. The map position identifying unit 32 executes step ST9 in a case where an input corresponding to permission of the notification to the map server 3 is made to the HMI 14 (that is, in a case where the permission button is pressed), and ends the determining process in a case where an input corresponding to non-permission of the notification thereto is made to the HMI 14 (that is, in a case where the non-permission button is pressed).

Next, the effect of the map information system 401 with the above configurations will be described. When the HMI 14 accepts the input (instruction) by the occupant to give the notification to the map server 3, the map position identifying unit 32 notifies the map server 3 that the map information should be updated. Accordingly, whether the map information should be updated is determined by the occupant, so that the accuracy of the determination as to whether the map information should be updated can be improved.

Concrete embodiments of the present invention have been described in the foregoing, but the present invention should not be limited by the foregoing embodiments and various modifications and alterations are possible within the scope of the present invention.

In the above third embodiment, the additional information includes the reception intensity of the GNSS signal. However, the present invention is not limited to this embodiment. The additional information may be any data as long as this data is desirably acquired when the vehicle travels autonomously. For example, the additional information may be the gradient data (gradient information) indicating the gradient value of each lane link (the road surface).

When such a configuration is adopted, the vehicle sensor 8 may include an attitude angle sensor 8A (see FIG. 1), which is a sensor for acquiring an attitude angle of the vehicle. For example, the attitude angle sensor 8A may consist of the 6-axis inertial measurement unit (IMU) configured to detect the angular velocity of the vehicle. In step ST21, the map position identifying unit 32 calculates the gradient value of the road surface based on the attitude angle acquired by the attitude angle sensor 8A. After that, the map position identifying unit 32 acquires the gradient data in the self-position on the map information identified by the own vehicle position identifying unit 53 (self-position identification unit), and compares the calculated gradient value of the road surface with the gradient data. The map position identifying unit 32 (the controller 16) executes step ST7 upon determining that the gradient data matches the gradient value of the road surface, and executes step ST22 upon determining that the gradient data does not match the gradient value of the road surface. Accordingly, it is possible to notify the map server 3 that the gradient data does not reflect an actual state. Further, the map server 3 gives the notification to the map information manager, so that the map information manager can easily recognize that the state around the road has changed.

In the above embodiment, the high-precision map stored in the map server 3 is updated based on the probe information acquired by the probe information acquiring unit 33. However, the present invention is not limited to this embodiment. For example, the semi-static information, the semi-dynamic information, and the like of the dynamic map stored in the map server 3 may be updated based on the probe information. Further, the navigation map data stored in the navigation device 11 may be updated based on the probe information.

The invention claimed is:

1. A map information system, comprising:
a plurality of vehicles configured to store plural pieces of map information and travel autonomously based on the map information; and
a map server configured to provide the vehicles with the map information,
wherein each vehicle includes:
an external environment sensor configured to acquire surrounding information on the vehicle;
a controller configured to store the map information, to estimate a position of the vehicle, and to execute travel control to cause the vehicle to travel autonomously;
a vehicle sensor for estimating a movement amount of the vehicle; and
a receiver configured to receive a signal from a positioning satellite,
wherein the controller is configured to execute first travel control and second travel control as the travel control, the first travel control being executed for estimating the position of the vehicle by using the movement amount based on the vehicle sensor so as to cause the vehicle to travel autonomously, the second travel control being executed for estimating the position of the vehicle based on the signal from the positioning satellite received by the receiver so as to cause the vehicle to travel autonomously based on the map information,
wherein in a case where the position of the vehicle can be estimated neither by using the movement amount based on the vehicle sensor nor based on the signal from the positioning satellite, the controller determines that the travel control based on the map information and the surrounding information cannot be executed,
wherein each of the vehicles transmits probe information including self-position to the map server,
wherein the map server executes an updating process to update the map information based on the probe information and, as a consequence, stores plural pieces of the map information generated at different periods,
wherein in a case where the position of a vehicle of the plurality of vehicles can be estimated, the corresponding controller compares the plural pieces of the map information with the surrounding information in reverse chronological order and determines whether one of the plural pieces of the map information matches the surrounding information, and
wherein in a case where one of the plural pieces of the map information matches the surrounding information for a vehicle of the plurality of vehicles and the one of the plural pieces of the map information is not the latest of the plural pieces of the map information stored in the corresponding controller, the corresponding controller notifies the map server that the latest of the plural pieces of the map information includes incorrect information due to executing the updating process based on incorrect information.

2. The map information system according to claim 1, wherein, for each vehicle, when the map information does not match the surrounding information, the corresponding controller extracts an area where the map information does not match the surrounding information, determines whether a moving object is present in the area based on a detection result of the external environment sensor, and determines that the corresponding travel control based on the map information and the surrounding information cannot be executed when the moving object is present in the area.

3. The map information system according to claim 1, wherein, for each vehicle, the map information includes additional information including information on reception intensity of the signal from the positioning satellite in each lane, and
the corresponding controller notifies the map server that the map information should be updated upon determining that the reception intensity of the signal from the positioning satellite received by the corresponding receiver does not match the additional information.

4. The map information system according to claim 1, further comprising, for each vehicle, an attitude angle sensor configured to acquire an attitude angle of the corresponding vehicle, wherein, for each vehicle, the map information includes additional information including gradient information indicating a gradient of a road surface, and the corresponding controller notifies the map server that the map information should be updated upon determining that the gradient information at the position of the corresponding vehicle in the map information does not match the attitude angle of the corresponding vehicle acquired by the attitude angle sensor.

5. The map information system according to claim 1, further comprising, for each vehicle, an input/output device configured to give notification to an occupant and accept an input by the occupant, wherein, for each vehicle, in a case where the map information does not match the surrounding information, the corresponding controller causes the input/output device to give the notification that the map information does not match the surrounding information and accept the input as to whether to notify the map server that the map information should be updated.

6. The map information system according to claim 1, wherein, for each vehicle, the map information includes attribute information indicating a travel direction of each lane, and the corresponding controller notifies the map server that the map information should be updated upon determining that a behavior of a surrounding vehicle acquired by the corresponding external environment sensor does not match the attribute information.

7. The map information system according to claim 1, wherein, for each vehicle, the map information includes positional information on lanes, and the corresponding controller notifies the map server that the map information should be updated upon determining that a number of lanes in front of the corresponding vehicle acquired by the corresponding external environment sensor does not match a number of lanes in front of the corresponding vehicle acquired from the map information.

8. A map information system, comprising:

a plurality of vehicles respectively including a storage to store plural pieces of map information and a controller for an autonomous travel based on one piece of the map information; and a map server configured to provide each vehicle with the map information, wherein each of the vehicles estimates self-position and transmits probe information including self-position to the map server, wherein the map server executes an updating process to update the map information based on probe information and, as a consequence, stores plural pieces of the map information generated at different periods, wherein each controller compares the plural pieces of the map information with the corresponding surrounding information in reverse chronological order and determines whether one of the plural pieces of the map information matches the corresponding surrounding information, and in a case where one of the plural pieces of the map information matches the corresponding surrounding information and the one of the plural pieces of the map information is not the latest of the plural pieces of the map information stored in the corresponding controller, the corresponding controller notifies the map server that the latest of the plural pieces of the map information includes incorrect information due to executing the updating process based on incorrect information.

* * * * *